B. COLEMAN.
COTTON BALE TIE.
No. 62,610. Patented Mar. 5, 1867
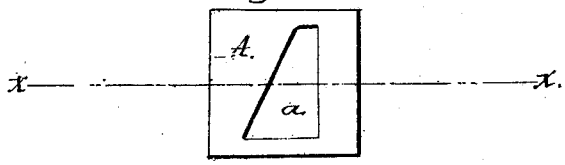
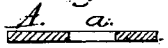
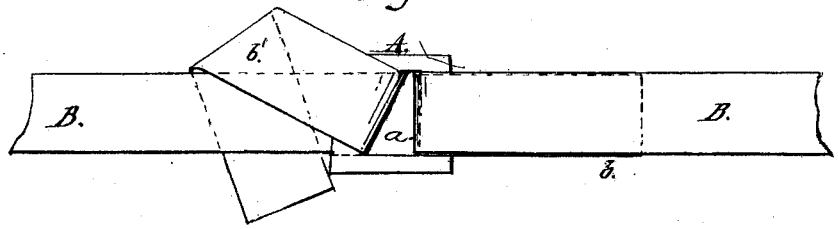
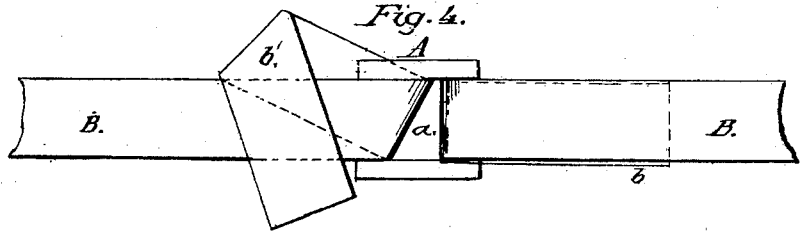

United States Patent Office.

BARRY COLEMAN, OF LOUISVILLE, KENTUCKY.

Letters Patent No. 62,610, dated March 5, 1867.

IMPROVEMENT IN COTTON-BALE TIE.

*The Schedule referred to in these Letters Patent and making part of the same.*

TO ALL WHOM IT MAY CONCERN:

Be it known that I, BARRY COLEMAN, of Louisville, in the county of Jefferson, and State of Kentucky, have invented a new and improved Bale Tie; and I do hereby declare that the following is a full, clear, and exact description thereof, which will enable others skilled in the art to make and use the same, reference being had to the accompanying drawings, forming part of this specification, in which—

Figure 1 represents the tie plate detached.

Figure 2 is a cross-section in the line $x\ x$, fig. 1.

Figure 3 represents the tie plate connected with the hoop on a cotton bale in one position.

Figure 4 represents the same in another position.

Similar letters of reference indicate like parts.

This invention relates to an improved device for fastening the hoops of cotton or other bales, and consists in a single iron plate slotted in such a manner that the ends of a bale hoop may be readily passed through it and secured so that they shall not slip.

The tie plate A is a rectangular piece of flat iron, either wrought or cast, in which is made a slot or opening, $a$, a trifle longer transversely than the hoop used is wide, in order that it may enter freely, and broader at one end than the other so that one of its sides of the opening shall cross the tie plate diagonally, while the other side shall cross at right angles, as shown in fig. 1. The narrow end of the opening is made broad enough to admit easily the two ends $b\ b'$ of the bale hoop B, side by side. One of the ends, $b$, is passed through the slot $a$, and bent around the square side thereof to lie underneath the hoop next the bale, and the other end, $b'$, may be passed through the slot from either side, and bent around the diagonal side to lie under or over the hoop, and then be again bent around the edge thereof, as shown in figs. 3, 4. The pressure of the bale by expansion after the hoop is fastened, when taken from the baling press against the ends of the hoop thus bent around the tie plate A, binds the ends firmly, and they cannot slip with any subsequent handling.

Having described my invention, I claim as new, and desire to secure by Letters Patent—

The rectangular tie plate A, having the square and diagonal-sided slot $a$, when applied to bale hoops for securing the ends, arranged substantially as herein described.

BARRY COLEMAN.

Witnesses:
 JNO. COLEMAN,
 JNO. J. SLATTERY.